United States Patent
Flanders et al.

(10) Patent No.: US 9,372,798 B2
(45) Date of Patent: Jun. 21, 2016

(54) DATA PROCESSING APPARATUS HAVING FIRST AND SECOND PROTOCOL DOMAINS, AND METHOD FOR THE DATA PROCESSING APPARATUS

(75) Inventors: William Henry Flanders, Austin, TX (US); Ramamoorthy Guru Prasadh, Austin, TX (US); Ashok Kumar Tummala, Austin, TX (US); Jamshed Jalal, Austin, TX (US); Phanindra Kumar Mannava, Austin, TX (US)

(73) Assignee: ARM Limited, Cambridge (GB)

( * ) Notice: Subject to any disclaimer, the term of this patent is extended or adjusted under 35 U.S.C. 154(b) by 72 days.

(21) Appl. No.: 14/380,298

(22) PCT Filed: Mar. 2, 2012

(86) PCT No.: PCT/US2012/027359
§ 371 (c)(1),
(2), (4) Date: Aug. 21, 2014

(87) PCT Pub. No.: WO2013/130090
PCT Pub. Date: Sep. 6, 2013

(65) Prior Publication Data
US 2015/0012713 A1    Jan. 8, 2015

(51) Int. Cl.
*G06F 12/08* (2016.01)

(52) U.S. Cl.
CPC ........ *G06F 12/0831* (2013.01); *G06F 2212/60* (2013.01)

(58) Field of Classification Search
None
See application file for complete search history.

(56) References Cited

U.S. PATENT DOCUMENTS 5,426,765 A * 6/1995 Stevens ................... G06F 13/18
711/131
5,961,623 A * 10/1999 James ................... G06F 13/4036
710/107
6,487,621 B1   11/2002 MacLaren
2003/0120874 A1   6/2003 Deshpande et al.
2005/0160209 A1 * 7/2005 Van Doren .......... G06F 12/0831
710/244

(Continued)

FOREIGN PATENT DOCUMENTS

| EP | 0 609 041 | 8/1994 |
|----|-----------|--------|
| JP | H08-16475 | 1/1996 |
| JP | 2000-76130 | 3/2000 |

OTHER PUBLICATIONS

International Search Report for PCT/US2012/027359, mailed Nov. 8, 2012, 2 pgs.

(Continued)

*Primary Examiner* — Yaima Rigol
(74) *Attorney, Agent, or Firm* — Nixon & Vanderhye P.C.

(57) ABSTRACT

A data processing apparatus (2) comprises a first protocol domain A configured to operate under a write progress protocol and a second protocol domain B configured to operate under a snoop progress protocol. A deadlock condition is detected if a write target address for a pending write request issued from the first domain A to the second domain B is the same as a snoop target address or a pending snoop request issued from the second domain B to the first domain A. When the deadlock condition is detected, a bridge (4) between the domains may issue an early response to a selected one of the deadlocked write and snoop requests without waiting for the selected request serviced. The early response indicates to the domain that issued the selected request that the selected request has been serviced, enabling the other request to be serviced by the issuing domain.

20 Claims, 8 Drawing Sheets

(56) References Cited

U.S. PATENT DOCUMENTS

| | | | |
|---|---|---|---|
| 2005/0160230 A1* | 7/2005 | Doren | G06F 12/0828 711/141 |
| 2005/0160231 A1* | 7/2005 | Doren | G06F 12/0828 711/141 |
| 2005/0160232 A1* | 7/2005 | Tierney | G06F 12/0831 711/141 |
| 2005/0160233 A1* | 7/2005 | Van Doren | G06F 12/0831 711/143 |
| 2005/0160238 A1* | 7/2005 | Steely, Jr. | G06F 12/0831 711/145 |
| 2005/0198192 A1* | 9/2005 | Van Doren | G06F 12/0815 709/217 |

OTHER PUBLICATIONS

International Preliminary Report on Patentability dated Sep. 12, 2014 in PCT/US2012/027359, 7 pages.

Japanese Office Action dated Jan. 27, 2016 issued in JP 2014-559873, machine English translation, 6 pages.

* cited by examiner

Domain A

Domain B

Case 1: Bridge sees WB first

Case 2: Bridge sees snoop first

DATA PROCESSING APPARATUS HAVING FIRST AND SECOND PROTOCOL DOMAINS, AND METHOD FOR THE DATA PROCESSING APPARATUS

This application is the U.S. national phase of International Application NO. PCT/US2012/027359 filed Mar. 2, 2012 which designated the U.S., the entire content of which is hereby incorporated by reference.

FIELD OF THE INVENTION

The present invention relates to the field of data processing. More particularly, the invention relates to a data processing apparatus comprising first and second protocol domains having different protocols for handling write requests and snoop requests.

DESCRIPTION OF THE PRIOR ART

A data processing apparatus may store different versions of the same data in multiple locations. For example, two devices may each have a local cache, and each cache may simultaneously hold versions of data associated with the same address in memory. A coherency protocol (e.g. a MESI protocol) may be used to ensure consistency of multiple versions of the same data. The coherency protocol may use write requests and snoop requests to maintain coherency. For example, a device storing a local version of a data value may issue a write request to request that the local version is written to another location, such as a memory. Other devices can then access the updated local version from the other location. Alternatively, if a device requires access to a particular data value, then it may issue snoop requests to other devices to check whether those devices are storing a local version of the data, and if so, to request access to the local version. Hence, data coherency can be maintained using the write requests and snoop requests.

SUMMARY OF THE INVENTION

Viewed from one aspect, the present invention provides a data processing apparatus comprising:

a first protocol domain and a second protocol domain each comprising at least one device configured to issue write requests for requesting that a local version of data associated with a write target address is written to another location and to receive snoop requests for requesting access to a local version of data associated with a snoop target address; and a bridge configured to transfer said write requests and said snoop requests between said first protocol domain and said second protocol domain;

wherein said first protocol domain is configured to operate under a write progress protocol in which, if said write target address for a pending write request is the same as said snoop target address for a pending snoop request, said pending snoop request is blocked until said pending write request has been serviced;

said second protocol domain is configured to operate under a snoop progress protocol in which, if said write target address for a pending write request is the same as said snoop target address for a pending snoop request, said pending write request is blocked until said pending snoop request has been serviced;

said bridge is configured to detect a deadlock condition in which said write target address for a pending write request issued from said first protocol domain to said second protocol domain is the same as said snoop target address for a pending snoop request issued from said second protocol domain to said first protocol domain; and said bridge is configured to issue, on detecting said deadlock condition, an early response to a selected request without waiting for said selected request to be serviced, said selected request comprising said pending write request or said pending snoop request, said early write response indicating to the issuing protocol domain that issued said selected request that said selected request has been serviced.

If a snoop request and a write request are pending in respect of the same target address, the state of the data accessed by the snoop request may be different depending on whether the write request has already been serviced at the time of servicing the snoop request. Therefore, different protocols may prescribe different rules for determining which of the write request and the snoop request is serviced first. In a snoop progress protocol, the pending write request is stalled until the pending snoop request has been serviced, while in a write progress protocol the pending snoop request is stalled until the write request has been serviced.

The present technique recognises that a deadlock condition can arise in an apparatus having a first protocol domain using the write progress protocol and a second protocol domain using the snoop progress protocol. The deadlock condition arises if a write target address of a pending write request issued from the first protocol domain to the second protocol domain is the same as a snoop target address of a pending snoop request issued by the second processing to the first protocol domain. In this condition, the first protocol domain will stall the pending snoop request until the pending write request has been serviced, according to the write progress protocol. However, the pending write request cannot be serviced because the second protocol domain will stall the pending write request until the pending snoop request has been serviced, according to the snoop progress protocol. Hence, each protocol domain will wait for the other protocol domain, preventing both the pending write request and the pending snoop request from being serviced.

To address this problem, a bridge connecting the first and second protocol domains may detect whether the deadlock condition has occurred. If the deadlock condition is detected, then the bridge may issue an early response to the pending write request or the pending snoop request without waiting for that request to be serviced (the request for which the early response is issued is referred to as the "selected request"). The early write response indicates to the issuing protocol domain that issued the selected request that the selected request has been serviced, even though the selected request has not actually been serviced. Since the selected request appears to have been serviced from the point of view of the issuing protocol domain, the other of the pending write request and pending snoop request is no longer blocked, and so the issuing protocol domain can now service the other request. Hence, the deadlock can be resolved.

The write request may comprise a write back request or a write clean request. A device which issues a write back request invalidates its local version of the data being written back to another location. Hence, the device no longer has exclusive access to the data and other devices may now access the data without checking with the device.

On the other hand, a device issuing a write clean request may retain exclusive access to the data being written back to the other location. The local version of the data would often be retained by the device that issued the write clean request. However, on some occasions the device may invalidate the data within the cache, but retain exclusive access to allow the data to be re-fetched into the cache without needing to issue a snoop request to check whether another device is storing a corresponding version of the data. While the device retains exclusive access, if another device wishes to store a local version of the data then the other device would issue a snoop request to the device to request access to the data.

It is possible that, after the bridge has issued the early response to unblock the deadlock, the issuing protocol domain could issue another selected request targeting the same target address as the selected request for which the early response was issued. For example, if the selected request is the pending write request, the first protocol domain could issue another write request for the same target address, and if the selected request is the pending snoop request, the second protocol domain could issue another snoop request for the same target address. If another selected request is issued, the new selected request may block the processing of the other request once more, causing the deadlock condition to arise again. This is particularly an issue with write clean requests and snoop requests, because the device which issues a write clean request or snoop request is more likely to issue a further write request for the same target address than a device issuing a write back request.

To resolve this problem, the bridge may detect, after issuing the early response to the selected request, whether another selected request has been issued by the issuing protocol domain, and if so, may issue another early response to the issuing protocol domain. The bridge may keep issuing early responses each time the issuing protocol domain issues another selected request for the same target address, to ensure that the other request can be serviced by the other protocol domain.

The issuing protocol domain may be configured to issue a maximum of M consecutive selected requests targeting the same address (where M is an integer). Therefore, eventually the issuing protocol domain will stop issuing another selected request targeting the same target address, allowing the other request to be serviced by the other protocol domain.

If the selected request is the pending write request, then in response to the deadlock being detected, the bridge issues an early write response to the first protocol domain, indicating that the write request has been serviced in the second protocol domain, to allow the snoop request to be serviced in the first protocol domain. Once the snoop request is serviced, the second protocol domain may issue a snoop response including snoop data. On receiving the snoop response, the bridge may merge the snoop data associated with the snoop response with write data associated with the pending write request, and transmit the merged data to the second protocol domain. By merging the write data with the snoop data, the snoop response can be used to obtain the data which would have been written in response to the write request, and so there is no need for the second protocol domain to separately process the pending write request that caused the deadlock condition. This speeds up handling of other requests at the second protocol domain following resolution of the deadlock.

The selected request may be either the pending write request or the pending snoop request for which the deadlock is detected. In some embodiments, the bridge may make a fresh selection of the selected request each time a deadlock condition is detected.

For example, the bridge may select the one of the pending write request and the pending snoop request which was latest to be detected by the bridge as the selected request. This approach means that the issuing of a later request cannot affect the way in which an earlier request is handled, since the early response to the later request forces the later request to make way for the earlier request, to allow the earlier request to be processed normally.

In other embodiments, the selected request may be a predetermined one of the pending snoop request and pending write request for which a deadlock is detected. For example, the bridge may always issue an early write response to the first protocol domain in order to resolve the deadlock and allow the pending snoop request to be serviced by the first protocol domain, or may always issue an early snoop response to the second protocol domain to allow the pending write request to be serviced by the second protocol domain.

The detection of the deadlock condition may be achieved in a number of ways. For example, the bridge may itself detect the deadlock by monitoring the target addresses of snoop requests issued from the second protocol domain and write requests issued from the first protocol domain, and triggering the deadlock condition when an address match is found.

Alternatively, one of the first and second protocol domains may detect the deadlock condition and issue a signal to the bridge if the deadlock condition is detected. In response to the signal, the bridge may detect the deadlock condition and issue the early response to the selected request. Hence, it is not essential for the bridge itself to actually identify the conflict between the addresses of the snoop request and write request—the term "detect" may encompass the bridge receiving a signal from another device indicating that the deadlock has occurred.

The bridge may maintain a snoop queue for queuing pending snoop requests issued from the second protocol domain to the first protocol domain. In some systems, at least one of the first and second protocol domains may service pending snoop requests in the order in which they were issued. In such a system, if the oldest outstanding snoop request in the snoop queue is blocked then other snoop requests may not be able to be serviced even if the target addresses associated with the later snoop requests are not deadlocked by a pending write request. Hence, the bridge may prioritise resolving a deadlock condition associated with the oldest outstanding snoop request in the snoop queue. For example, if the snoop queue contains a plurality of pending snoop requests, then the bridge may issue an early response only in response to detecting the deadlock condition for the oldest snoop request in the snoop queue that has not yet received a snoop response (the early response would be issued either in response to the oldest snoop request or in response to the write request which conflicts with the oldest snoop request, depending on which request is the selected request).

The bridge may have a write buffer for buffering pending write requests issued from the first protocol domain to the second protocol domain (in some embodiments the buffer may also buffer write requests travelling in the opposite direction). In some examples, the buffer may actually store the pending write requests, while in other examples the buffer may store data for tracking the pending write requests without actually storing the requests.

A problem can arise if, after issuing an early response to a pending write request, a further write request for the same write target address is issued by the first protocol domain and the write buffer does not have enough space to buffer the new write request. For example, the pending write request which triggered the early write response may have taken the last available space in the buffer. In this case, the lack of buffer space may prevent the further write request from being accepted from the first protocol domain, and so the write progress protocol of the first protocol domain may cause the first protocol domain to continue blocking the pending snoop request until the further write request has been accepted onto the write buffer.

To address this problem, the bridge may merge the further write request with the pending write request for the same target address, to allow both write requests to be buffered. The merged write request may be such that the data associated with the merged request is the same as the data which would result from carrying out the originally pending write request and the further write request in sequence. By merging write requests targeting the same address, the further write request can be accepted by the bridge, and so the first protocol domain having received the early write response for the further write request can now service the pending snoop request, to resolve the deadlock.

The write buffer may be arranged to retain a pending write request for which a deadlock condition has been detected until a snoop response to the conflicting pending snoop request has been received from the first protocol domain. In this way, the pending write request which caused the deadlock remains available for merging with a later write request issued by the first protocol domain until the snoop request has been serviced.

Merging of write requests may also be used by the write buffer to handle repeated write requests for the same target write address, irrespective of whether a deadlock condition has been identified for the target address. For example, if the first protocol domain issues two successive write requests for the same write target address, then these can be merged to save space in the buffer.

The first protocol domain may be configured to handle a maximum of N pending write requests issued to the second protocol domain, and the write buffer may have a capacity for buffering at least N pending write requests issued from the first protocol domain to the second protocol domain, where N is an integer. By providing buffer capacity for at least as many write requests as can be handled at a time by the first protocol domain, the buffer enables the bridge to compare the snoop target address of an incoming snoop request with the write target address of each pending write request issued from the first protocol domain, in order to detect the deadlock condition.

In some examples, the apparatus may comprise a write staging buffer coupled between the bridge and the first protocol domain. The write staging buffer may receive a write request issued by the first protocol domain, and pass the write request to the bridge if there is space in the write buffer for buffering the write request. This can reduce the amount of handshake signalling required between the bridge and the first protocol domain to determine whether messages can be received at the bridge.

When the deadlock condition is detected and an early write response is issued (i.e. the selected request is the pending write request), then the bridge may cancel the pending write request which triggered the deadlock. The second protocol domain may have reserved processing resources (e.g. buffer entries) for handling the write request, and so cancelling the write request enables these resources to be reallocated to another request while the deadlock remains unresolved. The cancelled write request can still effectively be serviced by merging the write data with the snoop response, as described above.

The cancelled write request may be retained in the write buffer until a snoop response to the pending snoop request is received from the first protocol domain, to allow merging with a later write request as described above.

It will be appreciated that although in some embodiments the bridge is a separate entity to the first and second protocol domains, in other embodiments the bridge may be implemented as part of a device within the first or second protocol domain.

Viewed from another aspect, the present invention provides a data processing apparatus comprising:

a first protocol domain means and a second protocol domain means for performing data processing, each comprising at least one device means for issuing write requests for requesting that a local version of data associated with a write target address is written to another location and for receiving snoop requests for requesting access to a local version of data associated with a snoop target address; and bridge means for transferring said write requests and said snoop requests between said first protocol domain means and said second protocol domain means;

wherein said first protocol domain means is configured to operate under a write progress protocol in which, if said write target address for a pending write request is the same as said snoop target address for a pending snoop request, said pending snoop request is blocked until said pending write request has been serviced;

said second protocol domain means is configured to operate under a snoop progress protocol in which, if said write target address for a pending write request is the same as said snoop target address for a pending snoop request, said pending write request is blocked until said pending snoop request has been serviced;

said bridge means is configured to detect a deadlock condition in which said write target address for a pending write request issued from said first protocol domain means to said second protocol domain means is the same as said snoop target address for a pending snoop request issued from said second protocol domain means to said first protocol domain means; and said bridge means is configured to issue, on detecting said deadlock condition, an early response to a selected request without waiting for said selected request to be serviced, said selected request comprising said pending write request or said pending snoop request, said early response indicating to the issuing protocol domain means that issued said selected request that said selected request has been serviced.

Viewed from a further aspect, the present invention provides a method for an apparatus comprising a first protocol domain and a second protocol domain each comprising at least one device configured to issue write requests for requesting that a local version of data associated with a write target address is written to another location and to receive snoop requests for requesting access to a local version of data associated with a snoop target address, wherein said first protocol domain operates under a write progress protocol in which, if said write target address for a pending write request is the same as said snoop target address for a pending snoop request, said pending snoop request is blocked until said pending write request has been serviced, and said second protocol domain operates under a snoop progress protocol in which, if said write target address for a pending write request is the same as said snoop target address for a pending snoop request, said pending write request is blocked until said pending snoop request has been serviced;

said method comprising steps of: detecting a deadlock condition in which said write target address for a pending write request issued from said first protocol domain to said second protocol domain is the same as said snoop target address for a pending snoop request issued from said second protocol domain to said first protocol domain; and on detecting said deadlock condition, issuing an early response to a selected request without waiting for said selected request to be serviced, said selected request comprising said pending write request or said pending snoop request, said early response indicating to the issuing protocol domain that issued said selected request that said selected request has been serviced.

Further particular and preferred aspects of the present invention are set out in the accompanying independent and dependent claims. Features of the dependent claims may be combined with features of the independent claims as appropriate, and in combinations other than those explicitly set out in the claims.

DESCRIPTION OF EMBODIMENTS

Figure 1:
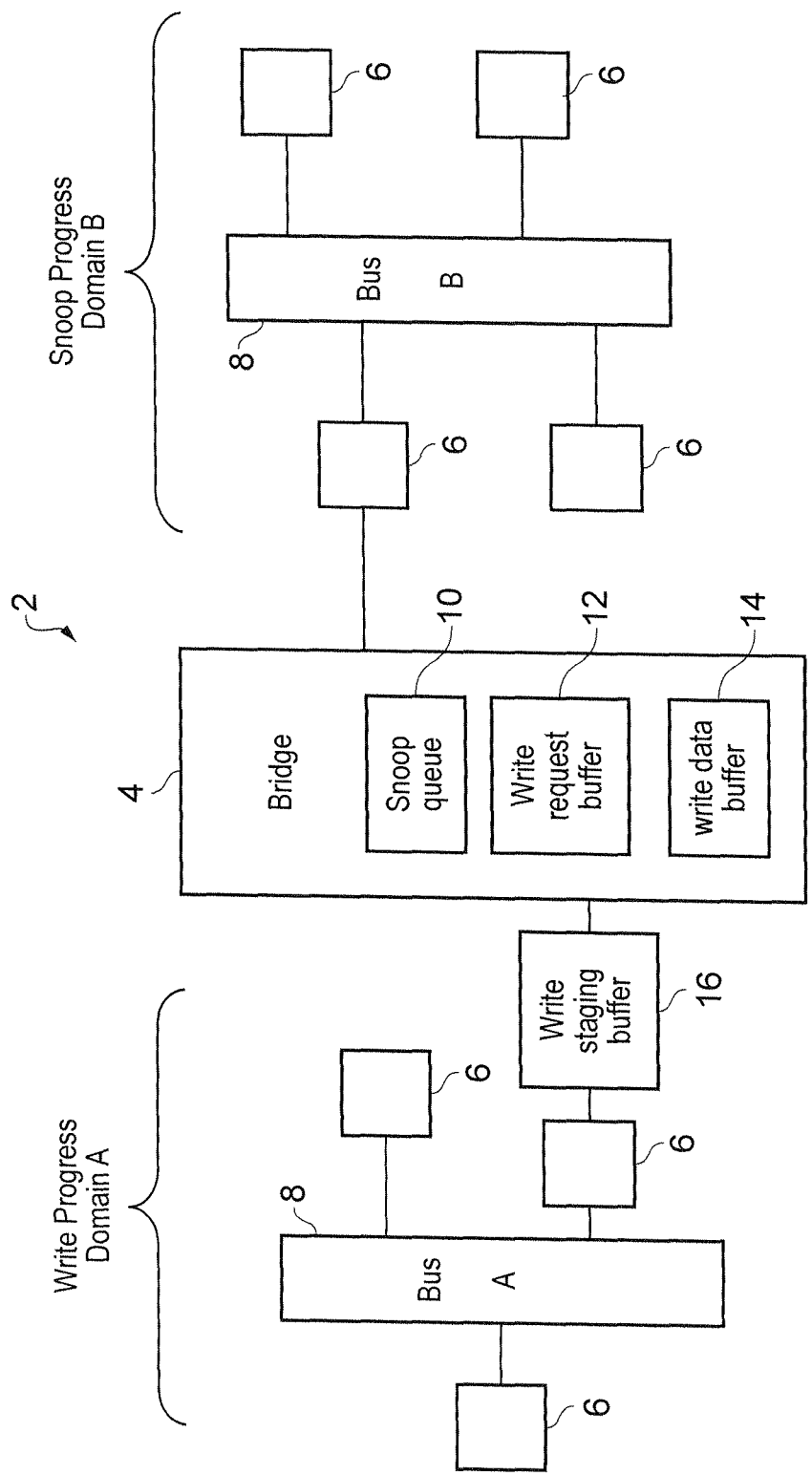
FIG. 1 schematically illustrates a data processing apparatus having first and second protocol domains.

FIG. 1 illustrates a data processing apparatus 2 comprising a first protocol domain A, a second protocol domain B and a bridge 4 linking the two domains. Each protocol domain A, B comprises several devices 6 which communicate with one another via a bus 8. The devices 6 may comprise any kind of processing device or storage device and may include master devices and slave devices. Each domain A, B may include at least one device capable of issuing write requests for writing a local version of a data value to another location and receiving snoop requests for requesting access to the local version of the data. The write requests and snoop requests may be exchanged between devices within the same protocol domain A, B or within different protocol domains.

The bridge 4 includes a snoop queue 10 for queuing snoop requests issued from a device in one domain to a device in the other domain, a write request buffer 12 for buffering write requests issued from a device in one domain to a device in the other domain, and a write data buffer 14 for storing data associated with the write requests buffered in the write request buffer 12. A write staging buffer 16 is also be provided between at least one of the domains A, B and the bridge 4 for staging write requests before they can be accepted by the write request buffer 12.

While the bridge 4 is illustrated as being separate from the processing domain A and the processing domain B in FIG. 1, it will be appreciated that in some embodiments the functions of the bridge 4 may be implemented using a device 6 within one of the domains A, B.

Figure 2:
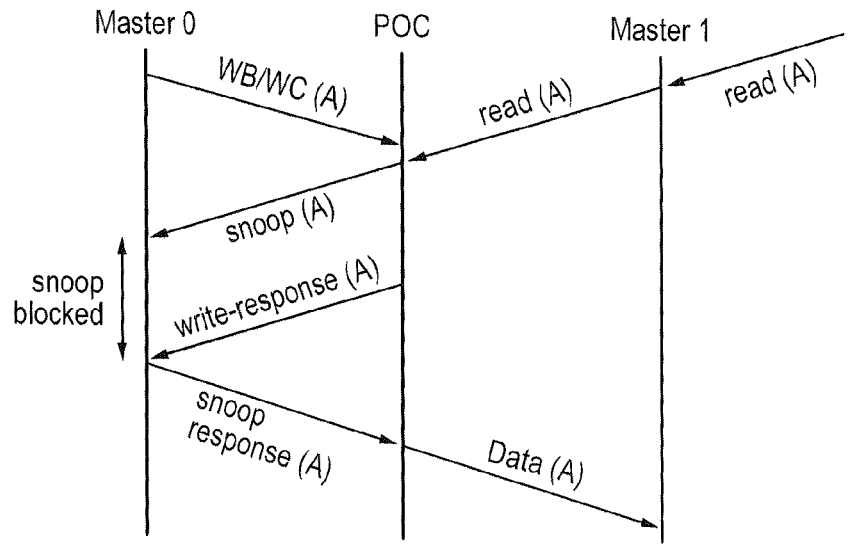
FIG. 2 illustrates an example of a write progress protocol of the first protocol domain.

The first protocol domain A operates under a write progress protocol. In a write progress protocol, if a write request is pending in respect of a write target address and a snoop request is also pending in respect of the same target address, then the pending snoop request is blocked until the write request has been serviced. FIG. 2 shows an example of devices of domain A operating under a write progress protocol. The devices include two master devices (e.g. a processor) and a point of coherency (POC), which may be a slave device (e.g. a memory), an interconnect or a bus via which requests are routed to a slave device (in some systems, the interconnect or bus may be responsible for managing coherency of data—in this case the interconnect/bus may appear to the master devices as a slave device).

In FIG. 2, a master device 0 issues to the point of coherency a write back (WB) or write clean (WC) request for writing a local data value associated with target address A to a target location accessible via the point of coherency. Meanwhile, in response to a read request from another master device 1, the point of coherency issues to the master device 0 a snoop request relating to the same target address A. Since a write request is already pending for target address A, the snoop request is blocked by master device 0 until a write response signal has been received from the point of coherency, indicating that the write has been serviced. After the write has been serviced, the snoop request is unblocked and a snoop response is issued to the point of coherency, which then sends the snooped data to master 1.

Figure 3:
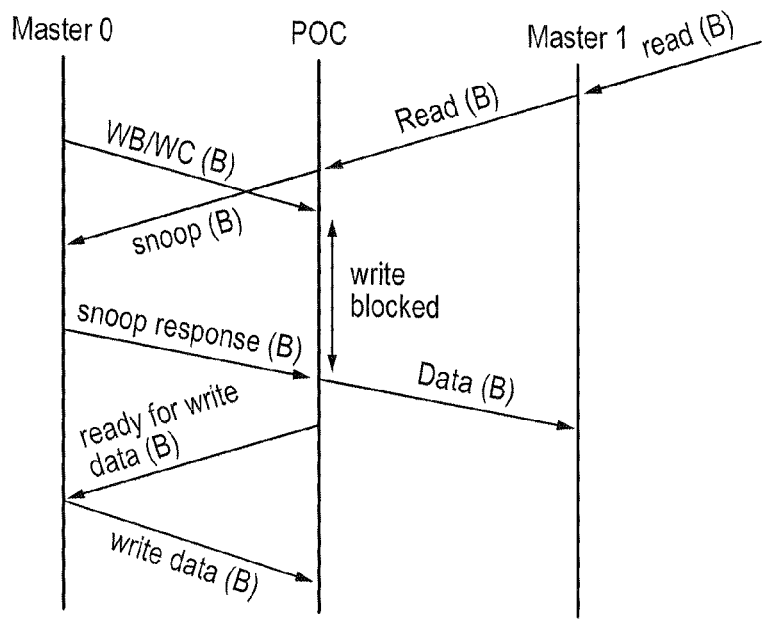
FIG. 3 illustrates an example of a snoop progress protocol of the second protocol domain.

In contrast, the second protocol domain B operates under a snoop progress protocol in which, when a snoop request is pending, a write request targeting the same target address as the snoop request is stalled until the snoop request has been serviced. FIG. 3 shows an example of devices within domain B operating under the snoop progress protocol. A snoop request is issued to master device 0 to request access to a local version of data associated with a target address B. Also, the master device 0 issues a write request to the point of coherency in respect of data associated with the same target address B. According to the snoop progress protocol, the write request cannot be serviced because a snoop request for address B is pending. Therefore, the point of coherency may defer a request for write data until the snoop response has been issued to the master device 1 by the master device 0. The master device 0 cannot issue the write data until the data request has been received from the point of coherency. Hence, the write request cannot be serviced until the snoop request is serviced.

It will be appreciated that different protocols prescribe different ways of dealing with write requests and snoop requests. For example, the use of write response, write ready and snoop response signals may be different in different protocols. For the purpose of the present invention, the exact details of the way in each protocol handles write requests and snoop requests are not important, provided that one domain operates with a write progress protocol and the other domain operates with a snoop progress protocol.

Also, while there are some protocols which always act as a write progress protocol or a snoop progress protocol, other protocols may not always act in this way, and may for example only operate as a write progress protocol or a snoop progress protocol under certain conditions. In such protocols, the present technique can be applied at times when one protocol is acting as a write progress protocol and the other protocol is acting as a snoop progress protocol and may not be applied at other times. Therefore, the term "configured to operate under a snoop/write progress protocol" does not imply that the protocol domain must always operate under the snoop/write progress protocol.

Figure 4:
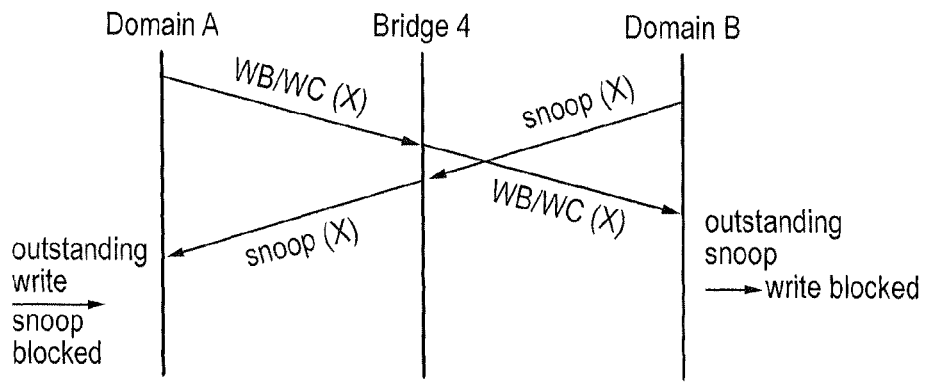
FIG. 4 illustrates an example of a deadlock condition.

FIG. 4 shows an example of a deadlock condition which can arise during communication between a device within the first protocol domain A operating under the write progress protocol and a device within the second protocol domain B operating under the snoop progress protocol. As shown in FIG. 4, if the first protocol domain A issues a write request to the second protocol domain B, and the second protocol domain B issues a snoop request to the first protocol domain A, then each domain will block the received request. The device in domain A will block the received snoop request for target address X according to the write progress protocol, because the issued write request for the same target address X has not been serviced. The device in domain B will block the received write request for target address X according to the snoop progress protocol, because the issued snoop request for the same target address X has not been serviced. Hence, both domains A and B will wait for each other to proceed before performing its own processing, causing a deadlock.

Figure 5:
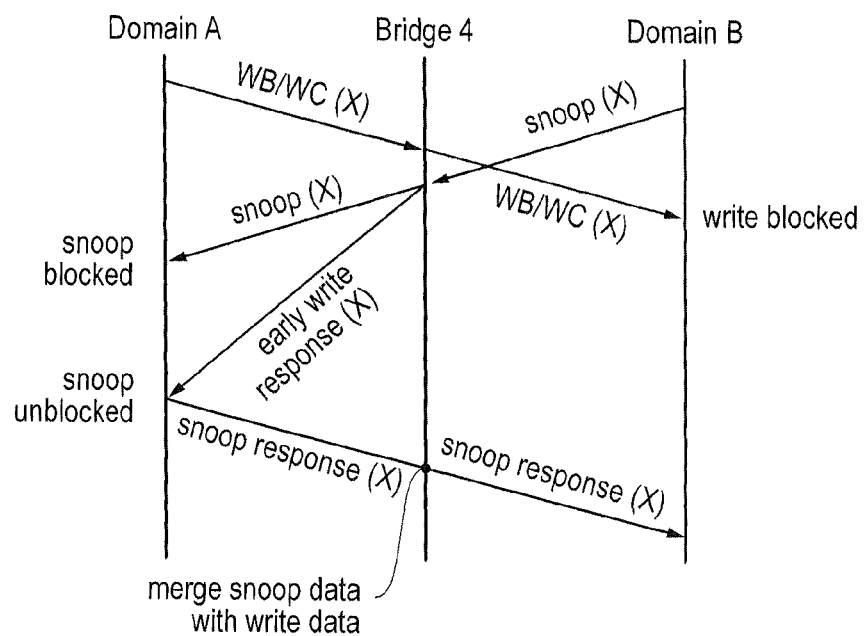
FIG. 5 illustrates an example of a technique for resolving the deadlock condition.

FIG. 5 shows an example of how the deadlock can be resolved. The bridge 4 can detect the presence of the deadlock condition, either by examining the addresses of the snoop request and the write request itself or by receiving a signal from one of the protocol domains A, B indicating that there is a deadlock condition. On detection of a deadlock, the bridge 4 issues an early response to one of the pending write and snoop requests to indicate that the corresponding request has been serviced. In the example of FIG. 5, an early write response is sent to the first protocol domain A to indicate that the pending write request in respect of the target address X has been serviced, even though the write request has not actually been serviced by the second protocol domain B. From the point of view of the first protocol domain A, the write has now been serviced, and so this unblocks the snoop request. The snoop request can now be serviced by the first protocol domain A. A snoop response is generated and sent to the second protocol domain B via the bridge 4. As the snoop response will typically contain the up-to-date data corresponding to the target address X (which would have been written back in response to the pending write request which caused the deadlock) it is no longer necessary to carry out the write request. If the write data of the pending write request includes data which is not included in the snoop response, then the bridge can merge the write data with the snoop data of the snoop response before sending the response to the second protocol domain B.

Hence, issuing an early response to the write request allows the deadlock to be resolved, thus allowing compatible communication between domains operating under conflicting coherency protocols.

Similarly, the deadlock could also be resolved by issuing an early snoop response to the second protocol domain B, indicating that the snoop request has been serviced in the first protocol domain A, to enable the pending write request to be processed in the second protocol domain B.

The bridge 4 may in some embodiments always send an early write response to the write request, or always send an early snoop response to the snoop request, in order to unblock the deadlock condition and allow the other request to continue. In such embodiments, which request receives the early response is predetermined and it does not matter which request is received first by the bridge.

Figure 6A:
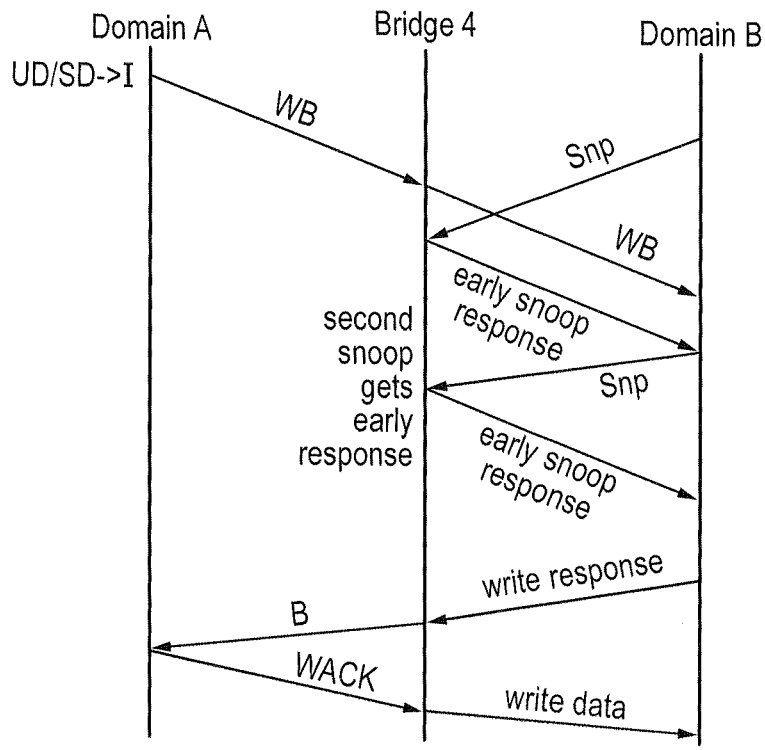
FIGS. 6A and 6B illustrate an example in which a deadlock condition is resolved by issuing an early response to the one of the pending write request and pending snoop request which is latest to be detected.
Figure 6B:
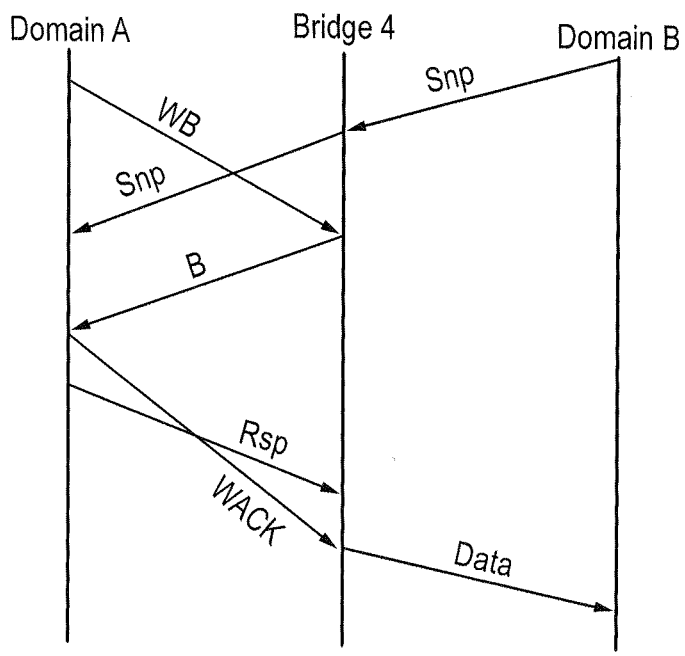

However, as shown in FIGS. 6A and 6B, in other embodiments the bridge 4 may issue an early response to the one of the pending snoop request and pending write request which is latest to be detected by the bridge 4. By sending an early response to the later of the requests for which the deadlock was detected, the earlier request is unblocked and may be processed in the normal way. This approach means that a later request cannot affect the way in which an earlier request is serviced.

As shown in FIG. 6A, if the pending write request WB from the first protocol domain A is encountered by the bridge 4 before the conflicting snoop request Snp from the second protocol domain B, then an early snoop response is issued to the second protocol domain B, indicating that the snoop request has been serviced in the first protocol domain A. This unblocks the write request and enables the write request to be handled by the second protocol domain B.

However, as shown in FIG. 6A it is possible that the second protocol domain B could issue another snoop request Snp targeting the same address, which would block the pending write request WB once more. To resolve this issue, the bridge 4 can issue another early snoop response each time the second protocol domain issues another snoop request targeting the same address. Eventually, the second protocol domain B stops issuing snoop requests targeting the same address, and so is now ready to handle the pending write request. The second protocol domain B issues a write response to the bridge 4 to indicate that it is ready to receive the write data associated with the write request. The bridge 4 then sends a write response B to the first protocol domain, and in response the first protocol domain A sends a write acknowledge signal WACK to the bridge 4. In response to the write acknowledge signal WACK, the bridge 4 transfers the write data to the second protocol domain B.

On the other hand, FIG. 6B shows an example where the snoop request Snp from the second protocol domain B is detected by the bridge 4 before the write request WB from the first protocol domain A. As the write request WB was the latest to be detected, the bridge 4 issues an early write response B to the first protocol domain A, indicating that the write request WB has been serviced in the second protocol domain B (even though the write request WB has not been serviced). This unblocks the snoop request Snp, and so the first protocol domain A then sends a snoop response Rsp to the bridge. Also, in response to the early write response B, the first protocol domain A issues a write acknowledge signal WACK to the bridge 4. When the bridge receives the write acknowledge signal WACK for a write request for which an early write response B has been issued, the bridge 4 merges the corresponding write data in the write data buffer 14 with the snoop data associated with the snoop response Rsp, to generate merged write/snoop data which is transmitted to the second protocol domain B. The merged data is the data which would arise if the write data and snoop data were successively written to the target location. By merging the data in this way, both the write request and the snoop request can be serviced without needing to issue another request.

Figure 7:
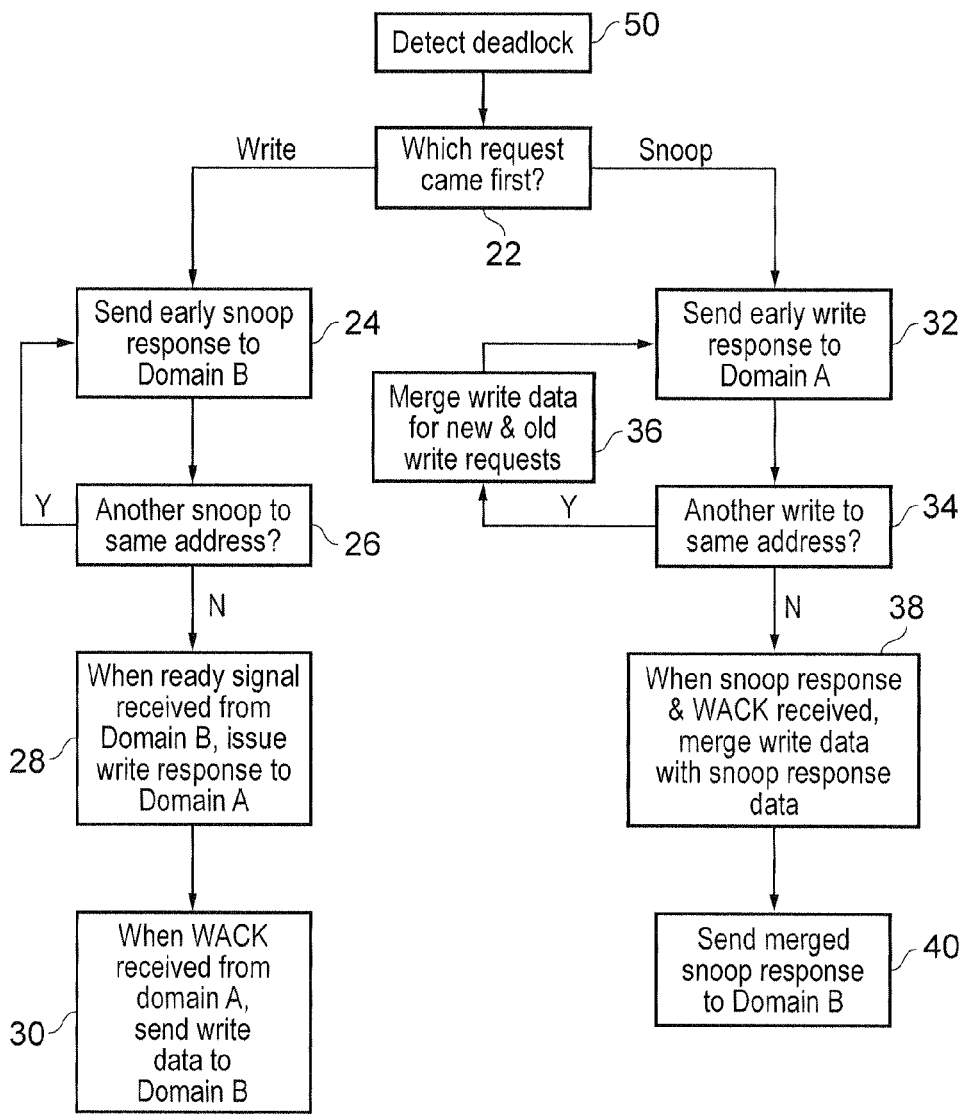
FIG. 7 illustrates a method of resolving a deadlock condition.

FIG. 7 illustrates a method of resolving a deadlock condition, according to the embodiment of FIGS. 6A and 6B. At step 20, a deadlock condition is detected for a write request issued from the first protocol domain A to the second protocol domain B and a snoop request issued from the second protocol domain B to the first protocol domain A, both requests targeting the same address. At step 22, the bridge 4 determines which of the snoop request and write request was detected first. The request that was detected second is the selected request for which an early response is issued.

If the write request was detected first (the case shown in FIG. 6A), then at step 24 an early snoop response is issued to the second protocol domain B. At step 26, the bridge 4 detects whether another snoop request has been issued by the second protocol domain B for the same target address as the snoop request for which the early response was issued. If so, then the method returns to step 24, where another early snoop response is issued to second protocol domain B.

Each time the second protocol domain B issues another snoop for the same target address, another early snoop response is issued, until eventually the second protocol domain B does not issue another snoop request for the same address. At this point, the pending write request is no longer blocked and so the second protocol domain B issues a ready signal to the bridge 4 indicating that the second protocol domain B is ready to receive the write data. In response to the ready signal, at step 28 the bridge 4 issues a write response to the first protocol domain A. When a write acknowledge signal WACK is received from the first protocol domain A, then at step 30 the bridge 4 transmits to the second protocol domain B the write data Data_I from the write data buffer 14 that is associated with the pending write request. Since the data associated with the target address has now been provided to the second protocol domain B, there is now no need to service the snoop request to which the early response was issued.

On the other hand, if at step 22 it is determined that the snoop request was detected before the write request (the case shown in FIG. 6B), then the write request is the selected request, and at step 32 the bridge 4 issues an early write response to the first protocol domain A, indicating that the write request has been serviced at the second protocol domain B (even though the write request has not actually been serviced). At step 34, the bridge 4 determines whether another write to the same address has been received. If so, then at step 36 the new write request is merged with the old write request in the write request buffer 12 and any associated write data is also merged in the write data buffer 14, and then at step 32 another early write response is issued to the first protocol domain A, to allow the pending snoop request to be unblocked once more.

Eventually, the first protocol domain A does not issue a further write request targeting the same address, and issues a snoop response to the pending snoop request. The first protocol domain A also issues a write acknowledge signal WACK in response to the early write response, indicating that the data in the write data buffer 14 associated with the write request can now be transmitted to the second protocol domain B. When the snoop response and write acknowledge signal are received, then at step 38 the bridge 4 merges the snoop response data with the write data for the pending write request which caused the deadlock. At step 40, a snoop response including the merged data is sent to the second protocol domain B. By merging the data in this way, there is no need to service the write request for which the early response was issued, since the snoop request has conveyed the required data to the second protocol domain B.

Hence, by issuing an early response to one of the snoop and write requests for which a deadlock is detected, the deadlock can be resolved to allow processing to continue.

Figure 8:
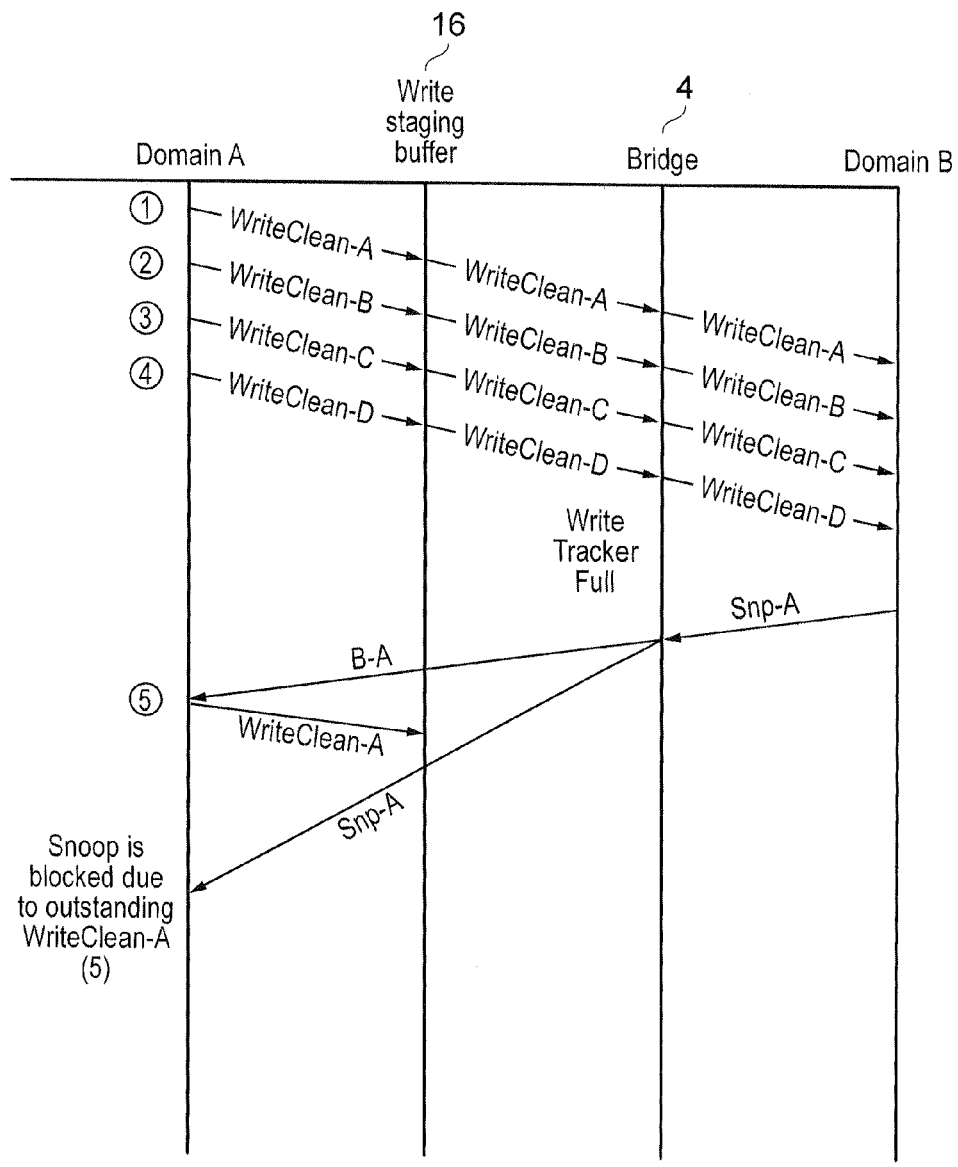
FIG. 8 illustrates an issue which may arise if the first protocol domain issues another write request for the same target address as a pending write request for which a deadlock condition has been detected when the write buffer is already full.

FIG. 8 illustrates an example of an issue which may arise when the write request buffer 12 and write data buffer 14 of the bridge 4 become full. The buffers 12, 14 have capacity for a finite number of write requests (FIG. 8 shows an example where the buffers can accommodate four requests, but it will be appreciated that in practice the write buffers 12, 14 may be larger). As shown in FIG. 8, after the first protocol domain A issues four write requests WriteClean-A to WriteClean-D in respect of four target addresses A, B, C, D then the buffer is full and cannot accept any further write requests. Addresses A, B, C and D may be the same address or different addresses.

As shown in FIG. 8, the domain B may then issue a snoop request Snp-A in respect of snoop target address A. Since there is a pending write request WriteClean-A targeting address A, then the deadlock condition is detected, and the bridge 4 may issue an early write response B-A to the first protocol domain A to try to resolve the deadlock condition (in this example, the write request is the selected request).

However, it is possible that, on receiving the early write response B-A indicating that the write request WriteClean-A has been serviced, the first protocol domain A may issue another write request WriteClean-A in respect of the same address A. In this case, the snoop request Snp-A still cannot be serviced because it is blocked by the new write request according to the write progress protocol of domain A. Moreover, as the write buffer 12 in the bridge 4 is already full, the new write request indicated with number 5 will not pass beyond the write staging buffer 16. Therefore, the protocol domain A will determine that this request is not being serviced and so will carry on blocking the snoop request Snp-A targeting the same target address.

This problem can be resolved by allowing the bridge 4 to merge the new write request with the older write request for the same address. A merged write can be generated with write data equivalent to the data which would result in the target location if the older write request and newer write request were performed one after the other. By merging the requests, the later write request can be accepted into the buffer. The bridge 4 then issues another early write response to the first protocol domain A to indicate that the later write request has been serviced (again, even though the second protocol domain B has not in fact serviced this write response). The devices of the first protocol domain A may issue only a finite number of successive write requests targeting the same write target address. Therefore, by continually issuing early response messages to the first protocol domain A each time another write request for the same target address is issued, and merging each write request with the earlier request for the same address in the buffer, eventually the first protocol domain A will issue a new write request for a different target address, thus unblocking the snoop request for which the deadlock was detected. The snoop request can then be serviced.

Figure 9:
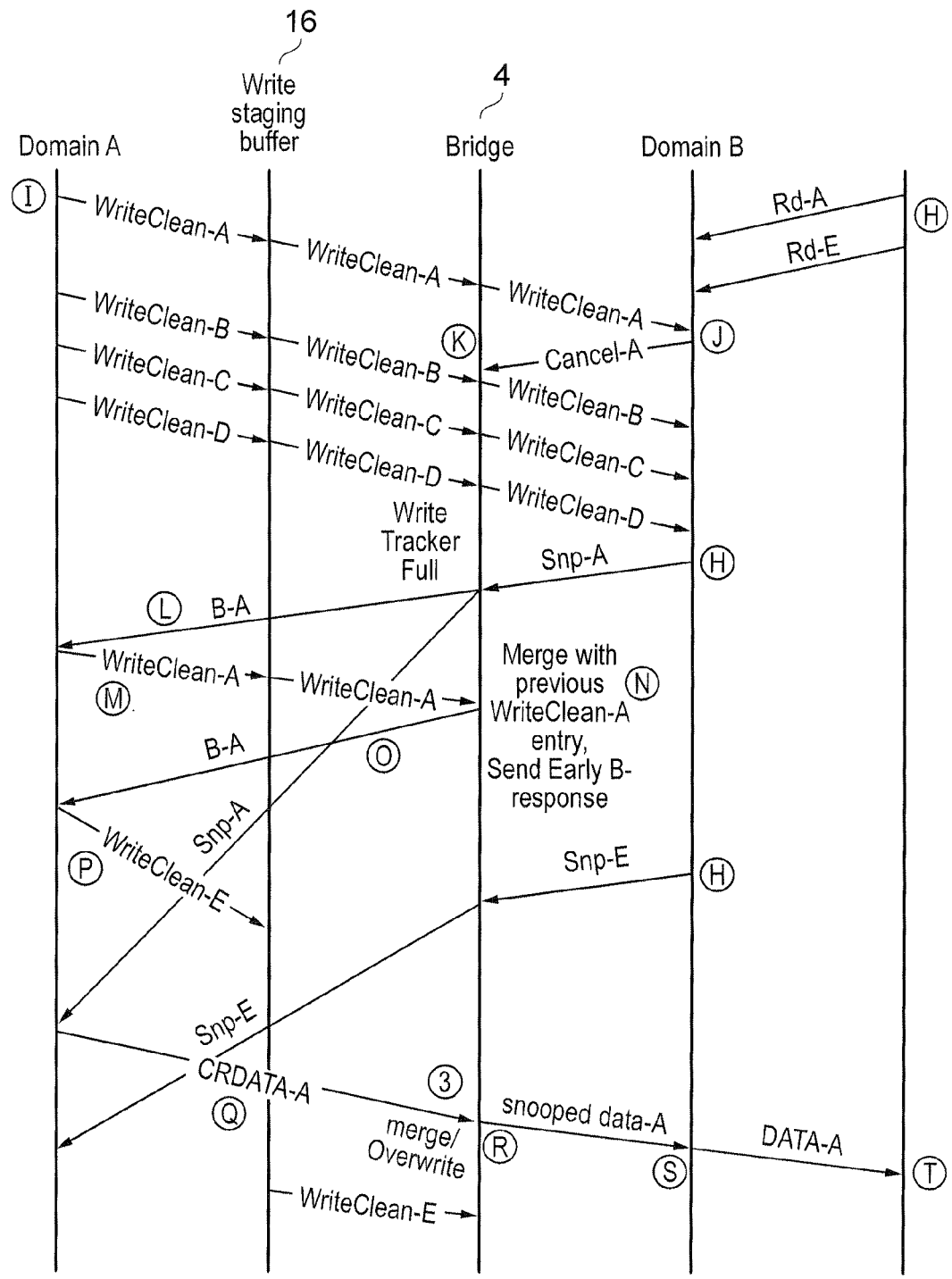
FIG. 9 illustrates an example of a technique for resolving the issue shown in FIG. 8 by merging the other write request with the pending request for the same target address.

FIG. 9 shows an example of the way in which the problem shown in FIG. 8 can be resolved. FIG. 9 shows a number of operations indicated and described below with respect to the circled letters. It will be appreciated that the order in which the operations are described and illustrated in FIG. 9 is not necessarily the temporal order in which the operations would actually be carried out—some operations may be performed in parallel or in a different order.

H: A device in the second protocol domain B issues two read operations Rd-A, Rd-E specifying target addresses A and E respectively. As versions of the data associated with addresses A and E could be stored by devices within the first protocol domain, the read operations Rd-A, Rd-E trigger snoop requests Snp-A, Snp-E to be issued from the second domain B to the first domain A.

I: The first protocol domain A issues four write requests WriteClean-A to WriteClean-D specifying target addresses A, B, C, D respectively. Again, the addresses A, B, C, D may be the same addresses or different addresses. If addresses B, C, D are different to address A, then write requests WriteClean-B to WriteClean-D can be serviced by the second domain B as no deadlock would be detected for these requests. If any of addresses B, C, D are the same as address A, then the corresponding write requests cannot be serviced because there is a pending snoop request for address A.

J: The second protocol domain B detects that a deadlock condition will arise between the write request Write-Clean-A and snoop request Snp-A specifying the same target address A, and issues a signal Cancel-A to the bridge 4.

K: On receiving the signal Cancel-A from the second protocol domain B, the bridge 4 detects the deadlock condition and cancels the write request WriteClean-A so that it will no longer be serviced (while not essential, cancelling the write request can free resources in the second protocol domain B for servicing other requests). However, the cancelled write request WriteClean-A is retained within the buffer to allow merging with a subsequent request if necessary.

L: On detecting the deadlock condition, the bridge 4 issues an early write response B-A to the write request WriteClean-A. On receiving the early write response B-A, the first domain A determines that the write has been serviced in the second domain B.

On receiving an early write response B-A, the first protocol domain A may either issue another write request specifying the same target address A as the write request which caused the deadlock (case M in FIG. 9), issue another write request specifying a different target address (case P in FIG. 9) or service the pending snoop request (case Q in FIG. 9).

M: If, in response to an early write response B-A, the first protocol domain A issues another write request targeting the same target address A as the address for which the deadlock was detected, then:

N: The bridge 4 merges the new write request with the previous write request for the same target address A. The merged data within the write data buffer 14 corresponds to the data which would result if the original write request and the subsequent write request were performed in sequence.

O: The bridge 4 sends another early write response B-A to the first protocol domain A. Hence, the first protocol domain A determines that the write has been serviced and may again select whether to issue another write request for the same target address (case M in FIG. 9), issue a write request for a different target address (case P) or handle the snoop request (case Q).

P: If the domain A issues a write request WriteClean-E which specifies a target address that is different to the target address of the pending write request WriteClean-A which caused the deadlock condition, then the deadlock for target address A is resolved because there is no longer any pending write request targeting that address A. Hence, the first protocol domain A is now free to service the snoop response (letter Q shown in FIG. 9).

Q: The protocol domain A will eventually issue a snoop response CRDATA-A in response to the snoop request Snp-A. The snoop response includes the value of the local version of the data associated with address A that is maintained within the first protocol domain A, as well as information on the coherency status of the local version.

R: The bridge 4 receives the snoop response and merges the snoop data associated with the snoop response with the data associated with the merged write request for target address A.

S: The bridge 4 sends the merged response data (snooped data-A) to the second protocol domain B.

T: The second protocol domain B uses the received snoop data to service the read request Rd-A. It is no longer necessary to carry out the write request WriteClean-A which caused the original deadlock, or any intervening write request WriteClean-A specifying the same target address, since the write data associated with these requests has been merged with the snoop data.

It will be appreciated that, while FIG. 9 shows an example in which only two early write responses B-A were required before the deadlock was resolved, on other occasions the first protocol domain A may repeatedly issue a further write request targeting the same target address as the write request which caused the deadlock (i.e. case M of FIG. 9 occurs several times in succession). In this case, the bridge 4 would continue to merge each new write request with the previous write request for the same address (letter N) and issue an early write response (letter O) until eventually the first protocol domain A either issues a write request targeting a different address (case P) or services the snoop request (case Q).

Also, in the example of FIG. 9, the issuing of write request WriteClean-E for target address E at letter P blocks servicing of the snoop request Snp-E issued for target address E at letter H. Hence, another deadlock condition will be detected for address E, and so the same operations as shown in FIG. 9 for the address A would also be used for address E. Where the deadlock condition is detected for more than one address, the bridge 4 may resolve the deadlocks one at a time, starting with the deadlock associated with the snoop request that is at the head of the snoop queue 10. This is because in some protocols, blocking of the oldest snoop in the snoop queue 10 may cause subsequent snoop requests to be blocked as well. In such a situation, then the bridge 4 may focus on resolving the deadlock condition identified for the snoop at the head of the snoop queue. Hence, regardless of the state of later snoops and whether there is a deadlock for those later snoops, the bridge 4 can detect deadlocks for the snoop at the head of the snoop queue 10 and issue an early write response only if a deadlock is detected for the oldest snoop request.

Unlike the example shown in FIGS. 6A and 6B, FIG. 9 shows an example in which the selected request is predetermined to be the pending write request, so that an early response is issued to the first protocol domain in response to the pending write request, irrespective of which of the pending write request and pending snoop request arrives first at the bridge 4.

FIG. 9 shows an example in which the deadlock condition is identified by the second protocol domain B and the bridge 4 detects the deadlock condition in response to the cancel signal Cancel-A issued by the bridge 4. However in another embodiment, the bridge 4 may detect the deadlock condition itself and cancel the write request WriteClean-A on detecting the deadlock condition, without receiving a signal from the second protocol domain B. The bridge 4 may then issue a signal to the second protocol domain B indicating that the write is to be cancelled.

Figure 10:
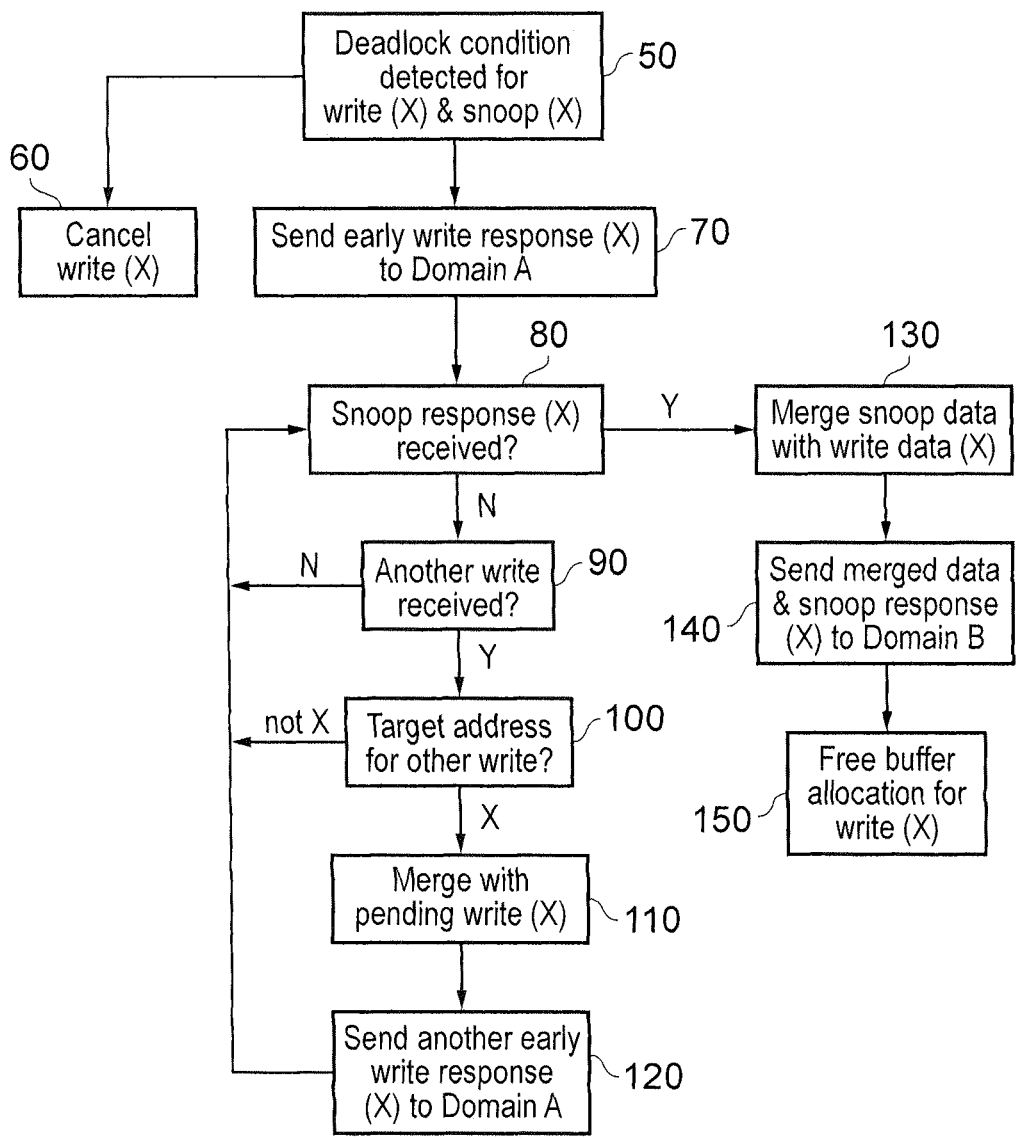
FIG. 10 illustrates a method of resolving a deadlock condition according to the example of FIG. 9.

FIG. 10 shows a method of detecting and resolving the deadlock condition according to the example of FIG. 9. At step 50, the deadlock condition is detected for a write request targeting a target address X and a snoop request targeting the same target address X, the write being issued from the first protocol domain A to the second protocol domain B and the snoop being issued from the second protocol domain B to the first protocol domain A. The deadlock condition may be detected by the bridge 4 directly or by the bridge 4 indirectly in response to a signal from either protocol domain A, B.

If the deadlock condition is detected, then at step 60 the write for target address X is cancelled by the bridge 4. Also, at step 70 an early write response to the write request for target address X is issued to protocol domain A.

At step 80, the bridge 4 determines whether a snoop response for target address X has been received. If not, then at step 90, the bridge determines whether another write request has been received from the first protocol domain A. If another write request has been received, then at step 100 the bridge 4 determines whether the target address for the other write request is the same as the target address X for which the deadlock is detected. If the target address is not the same as address X, or at step 90 no write had been received, then the bridge 4 continues waiting for a snoop response at step 80.

However, if at step 100 the target address for the other write request is determined to be the same as the target address X for which the deadlock is detected, then at step 110 the bridge 4 merges the other write request with the pending write request for target address X, to enable the new write to be accepted into the buffer even if the buffer is already full. At step 120, the bridge 4 issues another early write response to the new write request for target address X, to indicate to the first protocol domain A that the write request has been serviced (even though it has not actually been serviced in the second protocol domain B). The method now returns to step 80, where the bridge again waits for a snoop response from the first protocol domain A. Each time a new request for the same target address X is received (steps 90 and 100), the new request is merged with the earlier write request targeting the same address and an early write response is again sent (steps 110 and 120).

If at step 100 it is found that the other write request does not specify the same target address X as the pending write request, then the deadlock is broken as there is no longer a pending write request targeting the same address as the pending snoop request. Therefore, the first protocol domain A may now process the snoop request.

When a snoop response is received at step 80, then at step 130 the bridge 4 merges the snoop data received in the snoop response with the buffered write data for the pending write request for target address X. At step 140, the merged data is sent to the second protocol domain B. At step 150, the buffer allocation for the pending write request is freed for use by other requests.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

The invention claimed is:

1. A data processing apparatus comprising:
a first protocol domain and a second protocol domain each comprising at least one device configured to issue write requests for requesting that a local version of data associated with a write target address is written to another location and to receive snoop requests for requesting access to a local version of data associated with a snoop target address; and
a bridge configured to transfer said write requests and said snoop requests between said first protocol domain and said second protocol domain;
wherein said first protocol domain is configured to operate under a write progress protocol in which, if said write target address for a pending write request is the same as said snoop target address for a pending snoop request, said pending snoop request is blocked until said pending write request has been serviced;
said second protocol domain is configured to operate under a snoop progress protocol in which, if said write target address for a pending write request is the same as said snoop target address for a pending snoop request, said pending write request is blocked until said pending snoop request has been serviced;
said bridge is configured to detect a deadlock condition in which said write target address for a pending write request issued from said first protocol domain to said second protocol domain is the same as said snoop target address for a pending snoop request issued from said second protocol domain to said first protocol domain; and
said bridge is configured to issue, on detecting said deadlock condition, an early response to a selected request without waiting for said selected request to be serviced, said selected request comprising said pending write request or said pending snoop request, said early response indicating to the issuing protocol domain that issued said selected request that said selected request has been serviced.

2. The data processing apparatus according to claim 1, wherein said write requests comprise write back requests, and the device which issues a write back request is configured to invalidate said local version of said data associated with said write target address after writing said local version to said other location.

3. The data processing apparatus according to claim 1, wherein said write requests comprise write clean requests, and the device which issues a write clean request is allowed to retain exclusive access to said data associated with said write target address after writing said local version of said data to said other location.

4. The data processing apparatus according to claim 1, wherein said bridge is configured to detect, after issuing said early response to said selected request, whether said issuing protocol domain has issued another selected request for the same target address as the selected request for which said early response was issued, and if so, to issue to said issuing protocol domain an early response to said other selected request.

5. The data processing apparatus according to claim 4, wherein said issuing protocol domain is configured to issue a maximum of M consecutive selected requests targeting the same target address, where M is an integer.

6. The data processing apparatus according to claim 1, wherein if said selected request is said pending write request issued by said first protocol domain, then on receiving from said first protocol domain a snoop response to said pending snoop request after issuing said early response to said pending write request, said bridge is configured to merge snoop data associated with said snoop response with write data associated with said pending write request, and to transmit said merged data to said second protocol domain.

7. The data processing apparatus according to claim 1, wherein said selected request comprises the one of said pending write request and said pending snoop request that is latest to be detected by said bridge.

8. The data processing apparatus according to claim 1, wherein said selected request comprises a predetermined one of said pending write request and said pending snoop request.

9. The data processing apparatus according to claim 1, wherein one of said first and second protocol domains is configured to detect said deadlock condition and to issue a signal to said bridge if said deadlock condition is detected, and said bridge is configured to detect said deadlock condition in response to receipt of said signal.

10. The data processing apparatus according to claim 1, wherein said bridge is configured to maintain a snoop queue for queuing pending snoop requests issued from said second protocol domain to said first protocol domain.

11. The data processing apparatus according to claim 10, wherein if said snoop queue contains a plurality of pending snoop requests, said bridge is configured to issue said early response to said selected request only when a deadlock condition is detected for the oldest outstanding snoop request in said snoop queue.

12. The data processing apparatus according to claim 1, wherein said bridge comprises a write buffer configured to buffer pending write requests issued from said first protocol domain to said second protocol domain.

13. The data processing apparatus according to claim 12, wherein, on receiving a further write request from said first protocol domain having the same target write address as a pending write request buffered in said write buffer, said bridge is configured to merge said further write request with said pending write request.

14. The data processing apparatus according to claim 12, wherein said write buffer is configured to retain said pending write request for which said deadlock condition has been detected until a snoop response to said pending snoop request has been received from said first protocol domain.

15. The data processing apparatus according to claim 12, wherein said first protocol domain is configured to handle a maximum of N pending write requests, and said write buffer has capacity for buffering at least N pending write requests issued from said first protocol domain, where N is an integer.

16. The data processing apparatus according to claim 12, comprising a write staging buffer coupled between said bridge and said first protocol domain, wherein said write staging buffer is configured to receive a write request issued by said first protocol domain and to pass said write request to said bridge if there is space in said write buffer for buffering said write request.

17. The data processing apparatus according to claim 12, wherein said selected request is said pending write request for which said deadlock is detected, and said bridge is configured to cancel said pending write request on issuing said early response to said pending write request.

18. The data processing apparatus according to claim 17, comprising a write buffer configured to buffer pending write requests issued from said first protocol domain to said second protocol domain, wherein said write buffer is configured to retain said cancelled pending write request until a snoop response to said pending snoop request is received from said first protocol domain.

19. A data processing apparatus comprising:
a first protocol domain means and a second protocol domain means for performing data processing, each comprising at least one device means for issuing write requests for requesting that a local version of data associated with a write target address is written to another location and for receiving snoop requests for requesting access to a local version of data associated with a snoop target address; and
bridge means for transferring said write requests and said snoop requests between said first protocol domain means and said second protocol domain means;
wherein said first protocol domain means is configured to operate under a write progress protocol in which, if said write target address for a pending write request is the same as said snoop target address for a pending snoop request, said pending snoop request is blocked until said pending write request has been serviced;
said second protocol domain means is configured to operate under a snoop progress protocol in which, if said write target address for a pending write request is the same as said snoop target address for a pending snoop request, said pending write request is blocked until said pending snoop request has been serviced;
said bridge means is configured to detect a deadlock condition in which said write target address for a pending write request issued from said first protocol domain means to said second protocol domain means is the same as said snoop target address for a pending snoop request issued from said second protocol domain means to said first protocol domain means; and
said bridge means is configured to issue, on detecting said deadlock condition, an early response to a selected request without waiting for said selected request to be serviced, said selected request comprising said pending write request or said pending snoop request, said early response indicating to the issuing protocol domain that issued said selected request that said selected request has been serviced.

20. A method for an apparatus comprising a first protocol domain and a second protocol domain each comprising at least one device configured to issue write requests for requesting that a local version of data associated with a write target address is written to another location and to receive snoop requests for requesting access to a local version of data associated with a snoop target address, wherein said first protocol domain operates under a write progress protocol in which, if said write target address for a pending write request is the same as said snoop target address for a pending snoop request, said pending snoop request is blocked until said pending write request has been serviced, and said second protocol domain operates under a snoop progress protocol in which, if said write target address for a pending write request is the same as said snoop target address for a pending snoop request, said pending write request is blocked until said pending snoop request has been serviced;
said method comprising steps of:
detecting a deadlock condition in which said write target address for a pending write request issued from said first protocol domain to said second protocol domain is the same as said snoop target address for a pending snoop request issued from said second protocol domain to said first protocol domain; and
on detecting said deadlock condition, issuing an early response to a selected request without waiting for said selected request to be serviced, said selected request comprising said pending write request or said pending snoop request, said early response indicating to the issuing protocol domain that issued said selected request that said selected request has been serviced.

* * * * *